Aug. 22, 1944.   W. S. REYNOLDS   2,356,271
MOLDED ARTICLE TRANSFER MECHANISM
Filed June 4, 1940   4 Sheets-Sheet 1

INVENTOR
WARREN S. REYNOLDS
BY
ATTORNEYS

INVENTOR
WARREN S. REYNOLDS
BY
ATTORNEYS

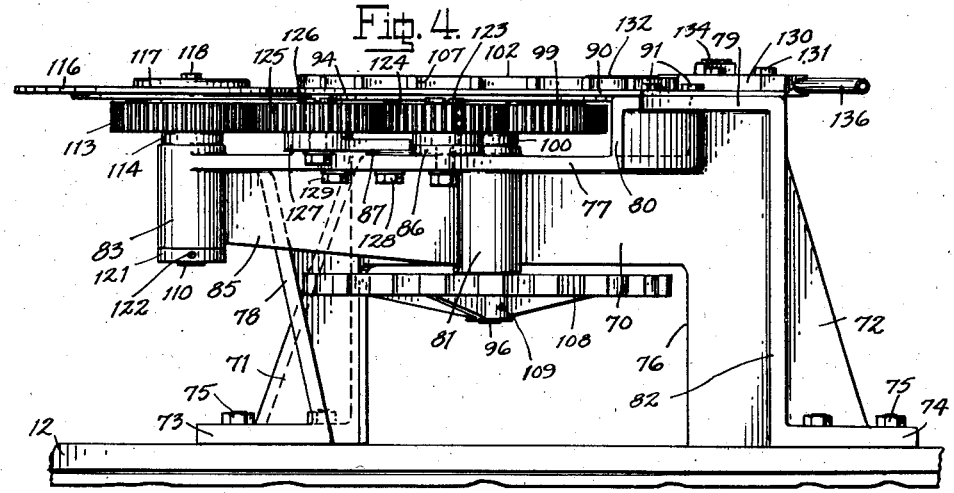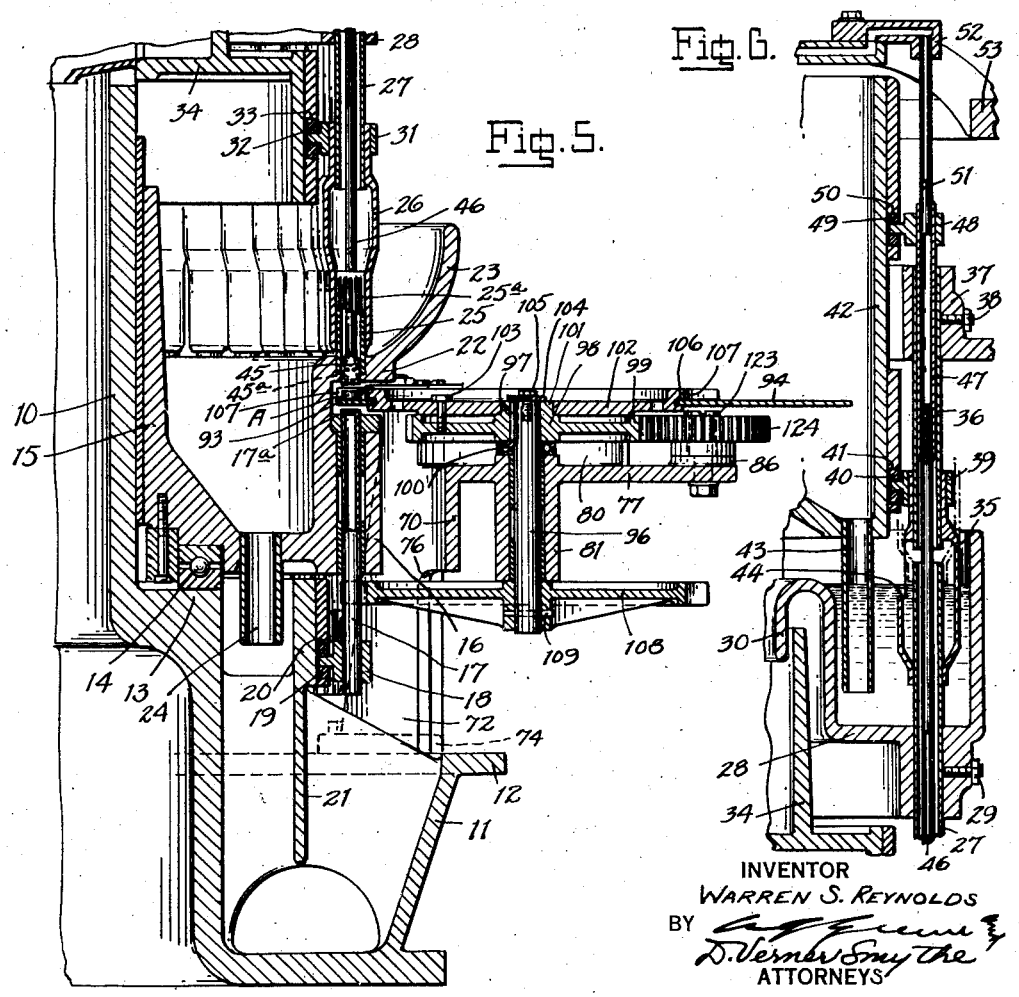

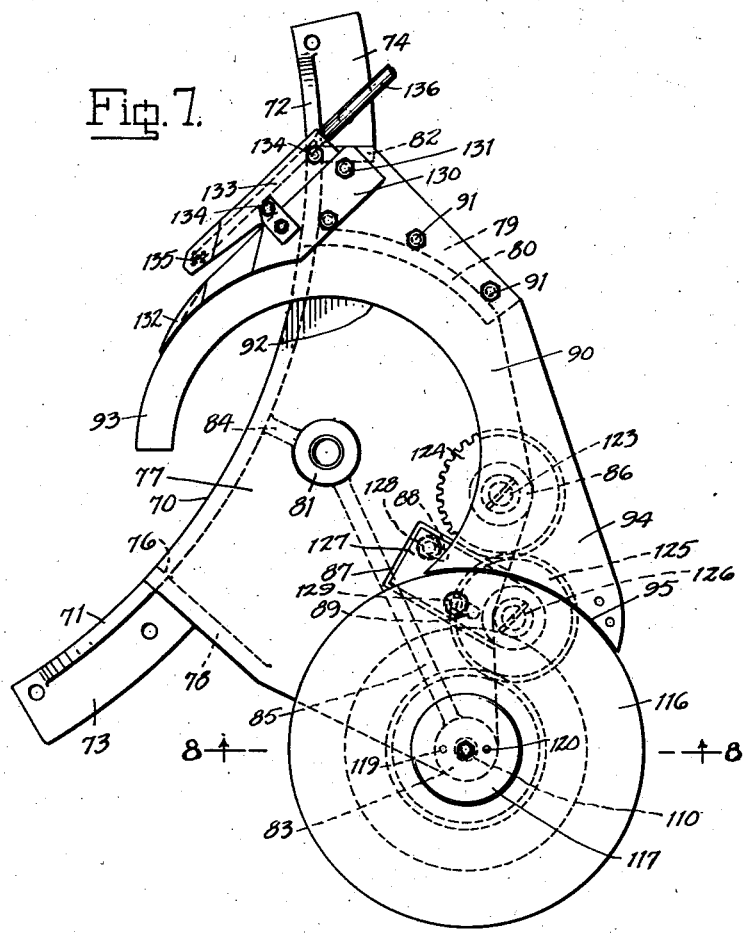

Patented Aug. 22, 1944

2,356,271

UNITED STATES PATENT OFFICE 2,356,271

MOLDED ARTICLE TRANSFER MECHANISM

Warren S. Reynolds, Stratford, Conn., assignor to Remington Arms Company, Inc., a corporation of Delaware Application June 4, 1940, Serial No. 338,676

2 Claims. (Cl. 198—22)

The present invention relates to a transfer apparatus, particularly for cooperative operation in connection with a machine for molding articles from a liquid slurry containing the article forming material in suspension, the articles being molded by compressing the material in dies in a manner to cause axial and lateral drainage of the liquid, so that the molded article as it is completed in the molding machine has a certain structural formation resulting from the method and is in a slightly plastic state. The machine disclosed by way of example in the present application is especially designed for the molding of wads for shot-gun shells, although the invention is not limited to this use. The process involved in the production of shot shell wads as produced in this machine is described in the patent to Watson H. Woodford, No. 2,026,765, granted January 7, 1936. According to this process the shot shell wad is molded from a mixture containing coarse fibrous material, wood pulp, sawdust, etc., in suspension in a liquid, a measured quantity of this liquid suspension being fed into individual molds, where it is molded to form a shot shell wad by compressing the solution to cause axial and lateral drainage of the liquid therefrom. The resulting wad which is in the form of a cylindrical disc, has the fibrous and other material three-dimensionally felted and interlocked for the purpose of giving certain characteristics to the shot shell wad which are otherwise not obtainable. At the time of the ejection of the wads from the molding machine they are not entirely dry, and have a certain amount of plasticity, and it is necessary to subject them to certain other finishing and drying operations outside the molding machine.

Inasmuch as shot shell wads must be very accurately shaped in order to perform effectually in shot-gun shells, it is extremely important that the molded structure and shape of the wads as they are formed in the molding machine be maintained, and it is an object of the present invention to provide a transfer apparatus for removing the molded wads from the molding machine to a conveyor, and by means of which the wads will be protected against distortion from side pressure, the apparatus at the same time accurately maintaining the cylindrical shape of the wads during their transition from the molding machine to the conveyor.

In the molding machine of the type contemplated herein, the molding dies and compressing plungers are carried upon a rotary carrier which is rotated in one direction continuously, the plungers being synchronously moved into relation to the molding dies by stationary cam means. In certain machines of this general type, heretofore in use, conveyors have been provided in the form of an endless belt moving along a line radial to or intersecting the path of the rotatable mold carrier, the molded articles being ejected directly upon this conveyor. As the direction of movement of the conveyor is transverse to the direction of rotation of the carrier the tendency has been to distort the wads as they are ejected upon the conveyor.

It is proposed in the present invention to provide a transfer apparatus which rotates synchronously with the carrier and which is arranged to transfer the wads as they are ejected from the molds by movement in a direction corresponding substantially to the direction of movement of the rotatable carrier, the transfer means being in the form of a rotatable member having a series of pockets which move through a circular path which is tangential to the rotary path of the mold carrier. It is further proposed to provide rotary pick-up means for rapidly removing the wads from the pockets of the rotary transfer member along a circular path tangential to the axes of the pockets, the wads being moved outwardly substantially parallel to the side walls of the pockets so that there is no tendency to exert side pressure upon the wads which might distort them from their cylindrical shape.

A further object is to provide a transfer apparatus which carries the wads individually from the molding machine along a widely curving path substantially continuous with the path of the wads in the mold carrier, and in which the movement is uninterrupted and exactly synchronized with the movement of the mold carrier.

With the above and other objects in view, an embodiment of the invention is shown in the accompanying drawings, and this embodiment will be hereinafter more fully described with reference thereto, and the invention will be finally pointed out in the claims.

In the drawings:

Fig. 4 is a side elevation thereof.

Fig. 5 is a vertical sectional view, taken along the line 5—5 of Fig. 2, and also showing in vertical section the portion of the molding machine immediately above the transfer apparatus.

Fig. 6 is a vertical sectional view showing in vertical section the upper portion of the molding machine which is cut off in Fig. 5.

Fig. 7 is a plan view of the transfer apparatus detached from the molding machine, and with the main driving gear and the wad transfer member removed.

Fig. 8 is a vertical sectional view taken along the line 8—8 of Fig. 7.

Figure 1:
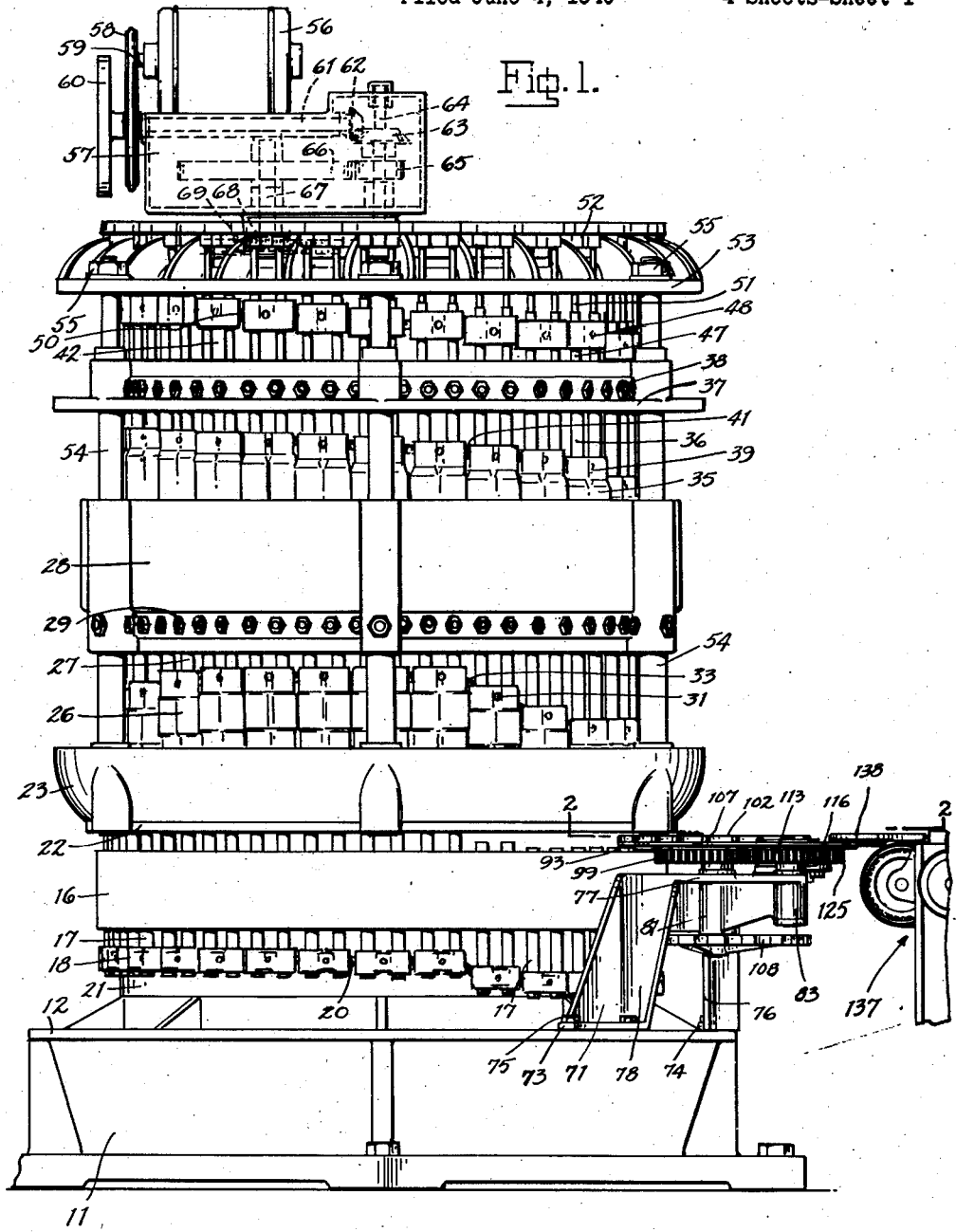
Fig. 1 is a side elevation of a wad molding machine, provided with transfer apparatus according to the exemplary illustrated embodiment of the invention.

While no claim is made in the present application to the molding machine, per se, the invention being particularly directed to the transfer apparatus for removing the molded wads from the machine to a conveyor, the transfer apparatus is cooperatively connected to the molding machine, is driven by the molding machine in synchronism thereof, and is especially adapted to the handling of the molded wads in the state in which they are ejected therefrom, so that a brief general description of the molding machine will be given for a fuller understanding of the complete operative cycle.

The molding machine in general is of the rotating type, having a stationary supporting structure carrying drive means and a series of stationary cams, and upon which is rotatably mounted a mold carrying structure provided with a series of wad forming molding units, the several movable operative parts of which are actuated by the stationary cams as the carrier is continuously rotated about the stationary support.

Referring to the drawings the molding machine comprises a stationary part consisting of a cylindrical hollow pedestal 10 supported upon a circular trough-like base 11 provided with a lateral rim flange 12, the pedestal being provided near its lower end with a circular ledge 13 carrying an anti-friction bearing support 14, upon which the lower end of the inner cylindrical bearing portion 15 of the mold carrier structure is rotatably mounted. The mold carrier structure includes a lower cylindrical portion 16 in which the lower vertically reciprocating plungers 17 are mounted, and to the lower ends of which are secured collars 18 provided with cam rollers 19 which engage a cam race 20 provided upon a cylindrical partition wall portion 21 of the stationary support. The collars 18 are preferably of dual form, i. e., one collar is connected to a pair of plungers 17. The plungers 17 are in the form of hollow tubes having liquid drainage perforations 17$^a$ in their upper ends.

The lower plunger supporting portion 16 is provided with a lateral upper face and in spaced relation above this face there is provided an upper molding die supporting annular portion 22, having an outwardly and upwardly curved bowl-like wall 23, for confining within the carrier the liquid expressed from the wad forming slurry, and from which it is directed through a drain 24 to the trough 11.

The upper mold part units each comprise a tubular mold 25 secured in the annular mold supporting portion 22 in axial alignment with the lower plunger 17, and having a series of vertical slits 25$^a$ through which the expressed liquid flows, as will hereinafter more fully appear. A tubular funnel and valve member 26 is slidably engaged at its lower contracted cylindrical end portion with the tubular mold member 25 and at its upper contracted cylindrical end portion is slidably engaged upon the lower end of a supporting tube 27 secured in the base of the annular slurry container member 28 of the carrier by set screws 29, the upper end of this tube 27 extending above the normal level of the slurry in the container, which level is determined by the overflow run flange 30. The relatively wide intermediate portion of the member 26 constitutes a funnel portion for feeding the slurry into the mold part 25. At the upper end of the funnel and valve member 26 there is secured a collar 31 having a cam roller 32 engaging the cam race 33 provided upon the annular baffle portion 34 of the stationary support and which cam race is adapted to raise and lower the tubular valve member 26 to close and open the slits 25$^a$ of the tubular mold 25.

Upon the upper end of the supporting tube 27 there is slidably engaged a tubular slurry measuring cup member 35, the intermediate portion of which is outwardly spaced from the tubular support 27 and the upper end of which is slidably engaged upon an upper stationary supporting tube 36, the lower end of which is spaced a short distance from the upper end of the tube 27, and the upper end of which is secured in the annular supporting ring member 37 of the mold carrier by set screws 38. To the upper end of the measuring cup member 35 there is secured a collar 39 provided upon the cylindrical wall of the upper slurry reservoir member 42 of the stationary support, and from which the slurry is fed to the annular slurry container 28 of the mold carrier by downpipes 43. The cam race 41 is designed to cause the measuring cup member 35 to be raised and lowered, and in the lowered position the inlet mouth 44 of the measuring cup member is carried below the level of the slurry in the container 28 so that it fills up with slurry. In the raised position the slurry contained in the measuring cup member which is at the level of its inlet mouth 44 is fed into the tube 27 through the space between the upper end of this tube and the lower end of the tube 36, and as indicated by the dot-and-dash lines, Fig. 6, this slurry flowing down to the funnel and valve member 26 and into the tubular mold 25.

The upper plunger of the mold consists of a plunger head 45 slidably engaged within the tubular mold part 25, and provided with a hollow shaft 46 which extends upwardly in spaced relation within the supporting tubes 27 and 36 where its upper end is screwed into an extension tube 47, slidably engaged within the upper supporting tube 36, and to the upper end of which tube 47 there is secured a collar 48 carrying a cam roller 49 engaged in a cam race 50 provided upon the upper portion of the cylindrical wall of the reservoir member 42 of the stationary carrier, this cam race adapted to cause the shaft 46 and the plunger head 45 to be vertically reciprocated.

The upper end of the extension tube 47 is slidably engaged upon an air-jet tube 51 supported in an air conduit member 52 mounted upon the radially ribbed spider head 53 of the mold carrier, and to which air is supplied by suitable means for the purpose of periodically producing an air-jet in the hollow plunger head 45, which is perforated as at 45$^a$, for this purpose, and which air-jet is employed for causing the molded wad to be effectually ejected, as will presently more fully appear.

The several annular members of the rotatable mold carrier, i. e., the annular mold carrying parts 16 and 22, the annular slurry container 28, the annular supporting ring 37, and the ribbed spider head 53, are rigidly connected together by vertical rods 54 engaged in suitable bearing portions of these parts and secured axially by nuts 55.

The driving mechanism for the mold carrier consists of a motor 56 mounted upon a gear casing 57 provided with a pulley 58, which through a belt 59 drives a pulley 60 of a horizontal shaft 61, provided with a beveled pinion 62 meshing with a bevel gear 63, of a vertical counter-shaft 64, and upon which there is provided a pinion gear 65 meshing with a large gear 66 provided upon a vertical drive shaft 67, this drive shaft being provided with a pinion gear 68 which meshes with and drives a ring gear 69 secured to the head of the rotatable mold carrier.

The transfer apparatus according to the invention is mounted upon the molding machine at a point coinciding with the wad ejecting position of the rotating mold carrier, this being the point where the wads have been completed in the molds and are ejected from the mold part 25 by an ejecting downward movement of the plunger 45 and an air-jet from the tube 51 after the lower plunger 17, which has been in its raised position to form a bottom for the mold part 25, has been moved to its lowered position, as indicated in Fig. 5, and wherein the completed and ejected wad is indicated by the letter A. The transfer member is engaged in the annular space between the lower plunger supporting part 16 and the upper mold supporting part 22, the path of movement of the transfer member being in a circular line tangential to the line of movement to the mold carrier, so that in the transition of the wad outwardly from the mold carrier there is no interruption in its speed and general direction of travel.

The transfer apparatus comprises a supporting frame consisting of an inner arcuate vertically disposed wall 70 concentric to the molding machine and provided with supporting leg portions 71 and 72 having attaching foot portions 73 and 74 respectively, which are mounted upon and secured to the lateral flange 12 of the molding machine by means of bolts and nuts 75. An opening 76 is provided in the wall 70 through which the driving gear of the transfer apparatus projects to engage and be driven by the lower mold plungers 17, as will hereinafter more fully appear.

A horizontal platform portion 77 projects outwardly from the upper edge of the wall 70, being supported at its forward edge by a web 78. At the rearward end of the platform 77 there is provided an upwardly offset platform portion 79 connected to the platform 77 by an arcuate vertical wall 80 which is concentric to a vertical bearing hub 81 formed upon the platform 77. The platform portion 79 is further supported by a vertical wall portion 82 extending downwardly to the foot portion 74. The platform 77 is provided in outwardly spaced relation to the hub portion 81 with a vertical bearing hub portion 83, strengthening webs 84 and 85 being respectively connected between the wall portion 70 and the hub 81 and between the hub 81 and the hub 83. The platform 77 is further provided with a vertical bearing portion 86 for mounting an idler gear, as will presently more fully appear, and between this bearing portion 86 and the bearing portion 83 there is provided a raised flat bearing portion 87 having a pair of parallel slots 88 and 89, for adjustably supporting the bearing bracket 75 member of a second idler gear, as will presently more fully appear.

A stationary wad supporting plate 90 is secured to the upwardly offset platform portion 79 by bolts 91, and is provided with a circular inner wall 92 concentric to the bearing hub 81 and defining at its inner side an arcuate arm portion 93 which extends into the ejection space of the molding machine in a position to receive the wads as they are ejected from the molding units. The circular wall 92 defines at its outer side an arm portion 94 having an arcuate forwardly disposed wall 95 which is concentric to the bearing hub 83.

Within the hub 81 there is rotatably supported a vertical shaft 96 upon the upper end of which there is fixedly secured by means of a key 97 the hub 98 of a large spur gear 99, an anti-friction ball bearing unit 100 being disposed between the gear hub 98 and the bearing hub 81. The hub 98 is shouldered, as at 101, and is engaged with the central aperture of the circular transfer member 102 which is rigidly secured to the gear 99 by bolts 103. The gear hub 98 is secured against vertical movement upon the shaft 96 by means of an overlapping disc 104 secured to the upper end of the shaft 96 by a bolt 105. The transfer member 102 is provided at its periphery with an annular laterally extending groove 106 engaged by the concentric wall 92 of the plate 90, and with a series of pockets 107 disposed at the upper side of the plate 90 which forms a bottom for the pockets. These pockets are diagonally disposed in the direction of rotation of the transfer member, are rounded at their bases, and are of such size as to freely receive the molded wads as they are ejected upon the arcuate arm portion 93, the diagonal position of the pockets causing them to propel the molded wads to the base of the pockets and to so retain them as the transfer member is rotated.

Upon the lower end of the shaft 96 there is mounted a driving gear 108 secured by a taper pin 109, and the teeth of which are designed to mesh with and be driven by the plunger members 17 of the mold carrier, so that the movement of the transfer member is at all times exactly synchronized and timed with the movement of the mold carrier. As a consequence the transition movement of the wads in the mold carrier and transfer member is in a continuous path without any interruption in the speed or direction of travel, the path of movement in the transfer member being along a widely curving circle tangential to the circular path of the mold carrier.

Within the hub 83 there is rotatably supported a vertical shaft 110 upon the upper end of which there is fixedly secured by means of a key 111 the hub 112 of a spur gear 113, an anti-friction ball-bearing unit 114 being disposed between the gear hub 112 and the upper end of the bearing hub 83. The hub 113 is provided with a double-stepped shoulder 115, which is engaged by the double-stepped shouldered central aperture of the circular pick-up disc member 116, fixed to the gear 113 by a retaining plate 117 secured to the upper end of the shaft 113 by means of a bolt 118, the disc and the plate being secured against relative rotation by a pin 119 engaged with the disc 116 and the hub 112, and a pin 120 engaged with the plate 117, the disc 116 and hub 112. The shaft 110 is secured against axial movement by means of a collar 121 engaged upon its lower end and secured by a set screw 122.

Within the vertical bearing portion 86 of the frame there is secured a shouldered stud shaft 123, upon which there is rotatably mounted an idler gear 124, meshing with the large spur gear 99 of the transfer member, and which also meshes with an idler gear 125 in turn meshing with the spur gear 113 of the pick-up disc, this latter idler gear being rotatably mounted upon a shouldered stud shaft 126 secured in a bearing bracket member 127 adjustably mounted upon the raised portion 87 of the frame by means of bolts 128 and 139 engaged through the slots 88 and 89. This train of gears is designed to impart rotary movement to the pick-up disc at substantially greater speed than the rotary movement of the transfer member and in an opposite direction to the direction of rotation of the transfer member.

Figure 2:
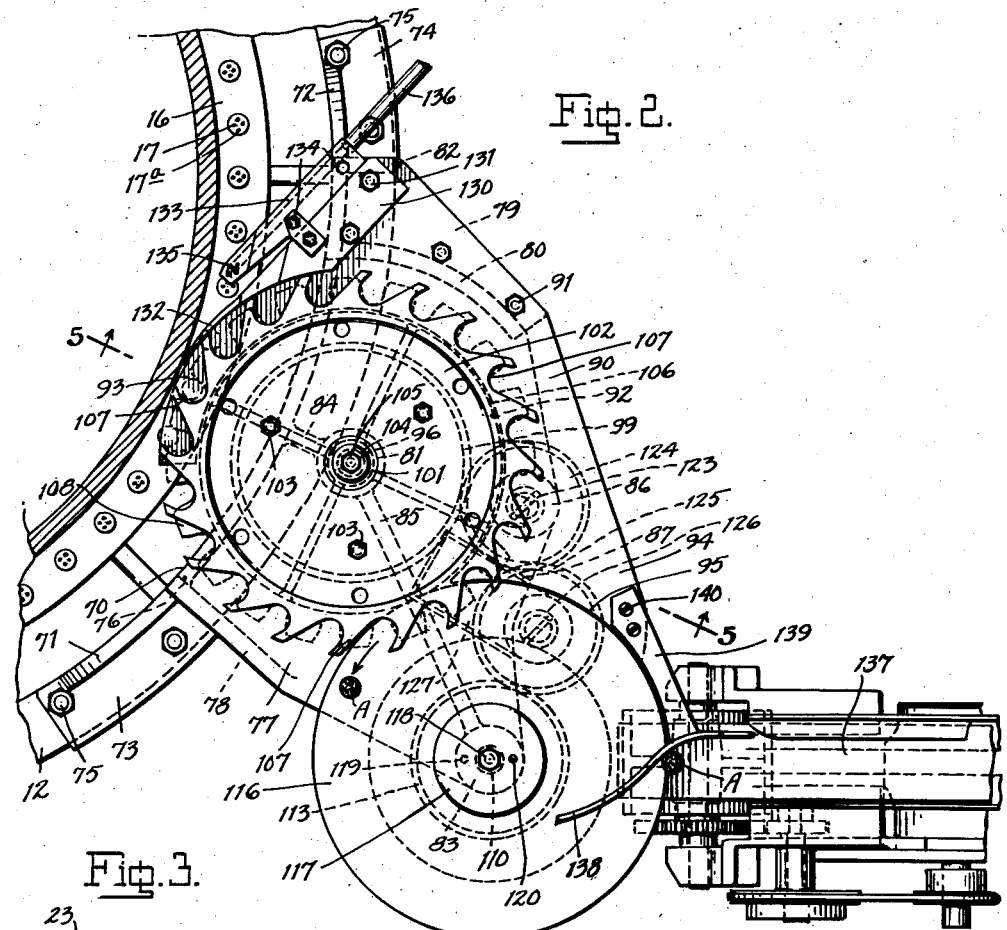
Fig. 2 is a plan view of the transfer apparatus, and showing the contiguous portion of the molding machine to which it is attached, the latter being shown in horizontal section along the line 2—2 of Fig. 1.
Figure 3:
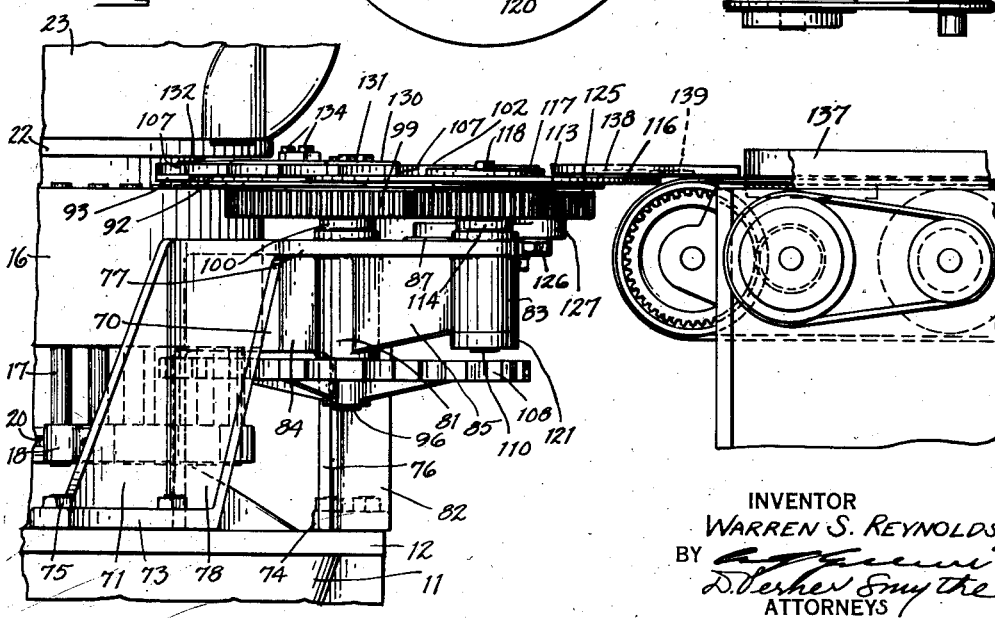
Fig. 3 is a front elevation of the transfer apparatus.

The pick-up disc 116 extends at its marginal portion beneath the pocket portions 107 of the transfer member and is flush with the surface of the plate 90, so that the pick-up member forms a rotatable support for the molded wads as they move from the stationary supporting plate 90. Inasmuch as this pick-up member rotates at a greater speed than the transfer member and as the path of movement of its marginal portion which overlaps the transfer member is in a circular path tangential to the circular path of the wads in the transfer member the wads disposed in the pockets will be moved from them along the diagonal axes of the pockets, the direction of movement as they emerge being along a widely curving path tangential to the axes of the pockets and as indicated by the arrow, Fig. 2. Consequently the wads are rapidly moved outwardly substantially parallel to the sides of the pockets so that there is no appreciable side pressing of the wads against the walls of the pockets which might tend to distort their shape.

Upon the rearward end of the plate member 90 there is provided a baffle member 130 secured by bolts 131 and having a tapered arcuate baffle wall 132 concentric to and surrounding the periphery of the transfer member from a point within the molding machine adjacent the wad ejecting position to a point substantially outside the molding machine, and which is adapted to protect the wads being transferred from the effects of air jets and water dripping, as well as to prevent any possibility of the wads being transferred becoming displaced from the transfer member.

An air jet member 133 is secured upon the inner side of the baffle member 130 by means of bolts 134, this member having at its inner end, contiguous to the mold plungers, a series of air-jets 135 at both its upper and lower surfaces, air being supplied thereto through a hose 136. These air jets serve to clean particles from the mold plungers as they move from the ejecting position, and as above pointed out the baffle wall 132 is so disposed with respect to the air jets that the molded wads in the conveyor are protected from their force.

Adjacent the pick-up disc there is provided a conveyor belt apparatus, indicated generally as 137, and to which the wads move from the pick-up disc. In order to guide the wads from the pick-up disc without any appreciable side pressure thereon, or abrupt change in their direction of travel, a convexly curved deflector arm 138 is provided upon a bracket member 139 secured to the forward end of the plate 94 by screws 140, and extends across the face of the pick-up disc diagonally with respect to the path of movement of the wads carried thereon, this arm being concavely curved outwardly from the edge of the disc where it extends from the edge of the pick-up disc cover the surface of the conveyor belt. As the wads are brought into contact with the arm 138 they are gradually moved off the edge through rolling contact with the arm on to the surface of the belt which removes them to the drier or other desired apparatus.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a transfer apparatus for removing relatively soft molded articles from a molding machine; a supporting frame; a rotary transfer member mounted in said frame for rotation in a horizontal plane, said transfer member having an annular series of spaced article receiving pockets opening outwardly at its periphery and having their axes inclined in the direction of rotation of said transfer member, said axes being inclined sufficiently and said pockets being sufficiently deep so as to engage an article and transfer the same from said molding machine without assistance; a fixed plate member mounted on said frame having an article supporting portion concentric to said transfer member and extending beneath said pockets from a point within the molding machine to a point outwardly spaced therefrom and adapted to form an article supporting bottom for said pockets, said transfer member being adapted to receive and positively remove articles from said molding machine; and a rotatable circular pick-up member supported in said frame for rotation in a horizontal plane having its upper surface flush with the upper surface of said plate member and having an annular marginal portion extending beneath said pockets at a point adjacent said fixed plate member to form a movable article supporting surface in continuation of said fixed plate member, said annular marginal portion being arranged to move in a path substantially tangential to the inclined axes of said pockets at the point of removal of the article from said pockets by said pick-up member, said pick-up member being driven at a greater speed than the speed of the annular series of pockets of said transfer member so as to pull articles out of said pockets.

2. In a transfer apparatus for removing relatively soft molded articles from a molding machine; a supporting frame; a rotary transfer member mounted in said frame for rotation in a horizontal plane, said transfer member having an annular series of spaced article receiving pockets opening outwardly at its periphery and having their axes inclined in the direction of rotation of said transfer member, said axes being inclined sufficiently and said pockets extending substantially the size of an article to be removed so as to positively loosely receive and engage an article and transfer the same from said molding machine without assistance; a fixed plate member mounted on said frame having an article supporting portion concentric to said transfer member and extending beneath said pockets from a point within the molding machine to a point outwardly spaced therefrom and adapted to form an article supporting bottom for said pockets, said transfer member being adapted to receive and positively remove articles from said molding machine; and a rotatable circular pick-up member supported in said frame for rotation in a horizontal plane having its upper surface flush with the upper surface of said plate member and having an annular marginal portion extending beneath said pockets at a point adjacent said fixed plate member to form a movable article supporting surface in continuation of said fixed plate member, said annular marginal portion being arranged to move in a path substantially tangential to the inclined axes of said pockets at the point of removal of the articles from said pockets by said pick-up member, said pick-up member being driven at a substantially greater speed than the speed of the annular series of pockets of said transfer member so as to pull articles out of said pockets.

WARREN S. REYNOLDS.